United States Patent
Lan et al.

(10) Patent No.: US 11,858,848 B2
(45) Date of Patent: Jan. 2, 2024

(54) REGULATING CEMENTITIOUS MATERIAL FOR PROMOTING HYDRATION OF PORTLAND CEMENT

(71) Applicant: Beijing University of Technology, Beijing (CN)

(72) Inventors: Mingzhang Lan, Beijing (CN); Tianrui Pei, Zhangjiakou (CN); Jianfeng Wang, Beijing (CN); Junjian Yang, Handan (CN); Zhifeng Chen, Tangshan (CN); Suping Cui, Beijing (CN); Yali Wang, Beijing (CN)

(73) Assignee: Beijing University of Technology, Beijing (CN)

( * ) Notice: Subject to any disclaimer, the term of this patent is extended or adjusted under 35 U.S.C. 154(b) by 170 days.

(21) Appl. No.: 17/485,790

(22) Filed: Sep. 27, 2021

(65) Prior Publication Data

US 2023/0025140 A1 Jan. 26, 2023

(30) Foreign Application Priority Data

Jul. 17, 2021 (CN) .......................... 202110809461.3

(51) Int. Cl.
| | |
|---|---|
| C04B 24/02 | (2006.01) |
| C04B 24/12 | (2006.01) |
| C04B 28/06 | (2006.01) |
| C04B 40/00 | (2006.01) |
| C04B 28/14 | (2006.01) |
| C04B 103/00 | (2006.01) |
| C04B 103/10 | (2006.01) |
| C04B 7/32 | (2006.01) |
| C04B 11/30 | (2006.01) |

(52) U.S. Cl.
CPC .......... C04B 28/065 (2013.01); C04B 24/023 (2013.01); C04B 24/122 (2013.01); C04B 24/123 (2013.01); C04B 28/14 (2013.01); C04B 40/0039 (2013.01); C04B 40/0042 (2013.01); C04B 7/323 (2013.01); C04B 11/30 (2013.01); C04B 2103/0008 (2013.01); C04B 2103/10 (2013.01)

(58) Field of Classification Search
CPC ... C04B 28/065; C04B 24/023; C04B 24/122; C04B 24/123; C04B 28/14; C04B 40/0039; C04B 40/0042; C04B 7/323; C04B 11/30; C04B 2103/0008; C04B 2103/10; C04B 2201/50; C04B 24/02; C04B 24/12; C04B 28/06; C04B 40/00; C04B 28/02; C04B 7/32; C04B 22/085; C04B 22/143; C04B 24/04; C04B 24/121; C04B 22/14; C04B 24/28; C04B 14/06
See application file for complete search history.

(56) References Cited

FOREIGN PATENT DOCUMENTS

| CN | 112062494 A | * | 12/2020 | |
| CN | 113060949 A | * | 7/2021 | ............... C04B 7/04 |

OTHER PUBLICATIONS

CN-112062494-A, machine translation (Year: 2020).*
CN-113060949-A, machine translation (Year: 2021).*

* cited by examiner

*Primary Examiner* — Bryan D. Ripa
*Assistant Examiner* — Marites A Guino-O Uzzle
(74) *Attorney, Agent, or Firm* — Rachel Pilloff; Sean Passino; Martin Cosenza

(57) ABSTRACT

A regulating cementitious material for promoting hydration of Portland cement is provided. The regulating cementitious material may include ingredients by weight as follows: ye'elimite, 27~68 parts; anhydrite, 29~68 parts; lithium nitrite, 2~5 parts; ethylene glycol monoisopropanolamine, 0.14~0.29 parts; triethanolamine acetate, 0.04~0.09 parts; and polyglycerol, 0.04~0.09 parts. An early strength of Portland cement can be improved through a cooperative hydration between minerals and an enhanced solubilization of a complexing agent.

6 Claims, No Drawings

REGULATING CEMENTITIOUS MATERIAL FOR PROMOTING HYDRATION OF PORTLAND CEMENT

FIELD OF THE DISCLOSURE

The disclosure relates to the field of building materials, and more particularly to a regulating cementitious material for promoting hydration of silicate clinker minerals.

BACKGROUND OF THE DISCLOSURE

The popularization and application of prefabricated buildings put forward higher requirements for a rapid production of prefabricated components, in order to speed up a mold turnover rate and improve production efficiency of an enterprise, early strength of the prefabricated components needs to meet the standard as soon as possible. At present, a steam curing method for the prefabricated components would cause problems of prefabricated components in the aspects of service safety and service life. Therefore, in view of the problems in the related art, a regulating cementitious material used for prefabricated components at room temperature to promote rapid hydration of Portland cement (also referred to as silicate cement) is provided by the disclosure.

Using an early strength agent is a common method to improve the early strength of cementitious materials. The early strength agent mainly is classified into an inorganic salt early strength agent, an organic early strength agent and a composite early strength agent. At present, the problem of the early strength agent is that a strength promotion effect is limited, especially an ultra-early strength improvement is weak, and it has poor adaptability to different cementitious materials.

In addition, existing experiments have shown that when an early strength mineral is used as a mineral admixture, ye'elimite would have a very fast hydration rate and consume calcium hydroxide while hydrating with an anhydrite, which can promote hydration of silicate minerals, but has limitations in improving the early strength of Portland cement. The early strength of Portland cement can be further improved by an addition of using the early strength mineral and the early strength agent as components, and a late strength can also be greatly improved. Moreover, a good strengthening effect can be achieved at an extremely low addition amount.

SUMMARY OF THE DISCLOSURE

A technical problem to be solved by the disclosure is to provide a regulating cementitious material for promoting hydration of Portland cement.

In order to solve the above technical problem, in one aspect, the disclosure exemplarily provides a regulating cementitious material composed of ingredients of inorganic minerals, an inorganic salt and organic substances, in parts by weight as follows:
ye'elimite, 27~68 parts;
anhydrite, 29~68 parts;
lithium nitrite, 2~5 parts;
ethylene glycol monoisopropanolamine, 0.14~0.29 parts;
triethanolamine acetate, 0.05~0.09 parts; and
polyglycerol, 0.05~0.09 parts; and
the ingredients in total are 100 parts by weight.

In an embodiment, a purity of the ye'elimite is greater than 97.5%, and the anhydrite is prepared by an anhydrite in a high-temperature furnace kept for 2 h at 200° C. (Celsius degrees).

In an embodiment, a molar ratio of the anhydrite to the ye'elimite is 11, that is, the ye'elimite is about 16 parts by weight and the anhydrite is 66 parts by weight.

In an embodiment, an average molecular weight of the polyglycerol is 200~500.

In an embodiment, the polyglycerol is triglycerol.

In another aspect, a preparation method of a regulating cementitious material for prefabricated components may include the following steps:

step 1, preparing a ye'elimite: mixing powders of calcium carbonate ($CaCO_3$), aluminum oxide ($Al_2O_3$) and calcium sulfate ($C\bar{S}H_2$) according to a molar ratio of $CaCO_3:Al_2O_3:C\bar{S}H_2=3:3:1$ to obtain a powder mixture, adding a ye'elimite powder of 5 wt % (i.e., 5% by weight) of the powder mixture into the powder mixture as crystalline seeds, then sequentially mixing evenly, compacting, and calcining by raising a temperature to 1350° C. in 2 hours (h) and then keeping the temperature of 1350° C. for 2 h, afterwards cooling to a room temperature in 1 minute (min) and grinding until all passing through 200 mesh sieve;

step 2, preparing an anhydrite: keeping a raw anhydrite at 200° C. for 2 h for calcining to obtain the anhydrite;

step 3, controlling a molar ratio of the anhydrite and the ye'elimite; and step 4, adding an ethylene glycol monoisopropanolamine, a triethanolamine acetate and a polyglycerol into a mixture of the anhydrite and the ye'elimite individually to thereby obtain a resulting mixture, and grinding the resulting mixture thoroughly.

In still another aspect, an application of a regulating cementitious material in promoting hydration of Portland cement is provided, and an addition amount of the regulating cementitious material is 10 wt % (i.e., 10% by weight) of the Portland cement.

Since the disclosure adopts the above technical solutions, the embodiments of the disclosure may mainly have the following beneficial effects or advantages:

as to the regulating cementitious material for promoting the hydration of Portland cement clinker minerals provided by the disclosure, the anhydrite is heated to 200° C., a dissolution rate may be the fastest, the inorganic mineral ingredients of the regulating cementitious material can provide strength during the hydration of itself and meanwhile consume calcium hydroxide produced from the hydration of tricalcium silicate ($C_3S$) and dicalcium silicate ($C_2S$) to promote further hydration of silicate minerals. The early strength agent of organic substances can accelerate dissolution of the minerals in an alkaline environment, an early hydration heat-release rate can be greatly increased and thereby the hydration can be accelerated, so that a relatively high early strength can be achieved and an improvement rate of 7 d compressive strength can reach up to 53.34%.

DETAILED DESCRIPTION OF EMBODIMENTS

The disclosure will be described in further detail below in conjunction with specific embodiments, but embodiments of the disclosure are not limited to these.

A ye'elimite mineral may be prepared as that: powders of calcium carbonate ($CaCO_3$), aluminum oxide ($Al_2O_3$) and calcium sulfate ($C\bar{S}H_2$) are mixed according to a molar ratio of $CaCO_3:Al_2O_3:C\bar{S}H_2=3:3:1$ to obtain a powder mixture, a powder of ye'elimite of 5 wt % of the powder mixture then is added into the powder mixture as crystalline seeds so that a resulting mixture is obtained; next, the resulting mixture is sequentially mixed evenly, compacted and calcinated by raising a temperature to 1350° C. within 2 h and then keeping/maintaining the temperature of 1350° C. for 2 h; and afterwards, the calcinated mixture is taken out and cooled to a room temperature within 1 minute (min), and then grinded until all passing through 200 mesh sieve.

An anhydrite may be prepared as that: keeping a raw anhydrite at 200° C. for 2 h for calcining in a high-temperature furnace.

Dosages of ingredients of a regulating cementitious material in various embodiments are as follows:

Embodiment 1

A regulating cementitious material for promoting rapid hydration of Portland cement may be composed of ingredients in parts by weight as follows:
ye'elimite, 67.02 parts;
anhydrite, 29.83 parts;
lithium nitrite, 2.91 parts;
ethylene glycol monoisopropanolamine, 0.14 parts;
triethanolamine acetate, 0.05 parts; and
polyglycerol, 0.05 parts.
Moreover, the ingredients in total are 100 parts by weight.

Embodiment 2

A regulating cementitious material for promoting the rapid hydration of Portland cement may be composed of ingredients in parts by weight as follows:
ye'elimite, 45.70 parts;
anhydrite, 50.92 parts;
lithium nitrite, 2.91 parts;
ethylene glycol monoisopropanolamine, 0.29 parts;
triethanolamine acetate, 0.09 parts; and
polyglycerol, 0.09 parts.
Moreover, the ingredients in total are 100 parts by weight.

Embodiment 3

A regulating cementitious material for promoting the rapid hydration of Portland cement may be composed of ingredients by weight as follows:
ye'elimite, 34.06 parts;
anhydrite, 60.82 parts;
lithium nitrite, 4.75 parts;
ethylene glycol monoisopropanolamine, 0.19 parts;
triethanolamine acetate, 0.09 parts; and
polyglycerol, 0.09 parts.
Moreover, the ingredients in total are 100 parts by weight.

Embodiment 4

A regulating cementitious material for promoting the rapid hydration of Portland cement may be composed of ingredients by weight as follows:
ye'elimite, 27.49 parts;
anhydrite, 67.30 parts;
lithium nitrite, 4.74 parts;
ethylene glycol monoisopropanolamine, 0.29 parts;
triethanolamine acetate, 0.09 parts; and
polyglycerol, 0.09 parts.
Moreover, the ingredients in total are 100 parts by weight.

In an application in promoting hydration of Portland cement, an addition amount of the regulating cementitious material may be 10 wt % of the Portland cement. According to the dosages of raw materials (i.e., ingredients), dry powders of raw materials in each of the above illustrated embodiments 1-4 are evenly mixed and placed in a cement mortar mixing pot/vessel. 1 part by weight of the regulating cementitious material and 3 parts by weight of Chinese ISO standard sand are taken, cement mortars in form of a 40 mm×40 mm×160 mm prism specimen prepared by a group of plastic cementitious sands made as per a water-cement ratio of 0.5 are placed in water and maintained to a specified age at 20° C., and then a strength test is carried out on a universal testing machine. The test shall be carried out in accordance with a testing method specified in GB/T17671-1999 (Method of testing cements-Determination of strength (ISO method)).

The dry powders of raw materials are evenly mixed according to predetermined dosages in each of the above illustrated embodiments 1-4 to obtain a dry powder mixture and then placed in a cement paste mixing pot/vessel, the water-cement ratio is determined to be 0.35, the dry powder mixture is stirred in a form of slow stirring (rotational speed of 140 revolutions per minute (r/min)) for 2 min first, then is stopped for 15 seconds (s), and afterwards is stirred in a form of quick/fast stirring (rotational speed of 280 r/min) for 2 min, 20 mm×20 mm×20 mm cement paste blocks are then formed in a six-piece mold and placed in water and maintained to a specified age at 20° C., and thereafter, a strength test is performed on a universal testing machine.

TABLE 1 test results of flexural strengths of cement mortars

| Flexural strengths | Blank control group | Embodiment 1 | Embodiment 2 | Embodiment 3 | Embodiment 4 |
|---|---|---|---|---|---|
| 1 d | 3.64 | 4.73 | 4.31 | 4.15 | 5.12 |
| 3 d | 4.95 | 5.79 | 5.64 | 5.98 | 7.32 |
| 7 d | 7.21 | 8.62 | 8.14 | 9.23 | 10.15 |

TABLE 2 test results of compressive strengths of cement mortars

| Compressive strengths | Blank control group | Embodiment 1 | Embodiment 2 | Embodiment 3 | Embodiment 4 |
|---|---|---|---|---|---|
| 1 d | 9.37 | 13.37 | 12.14 | 12.87 | 13.95 |
| 3 d | 22.15 | 27.47 | 25.41 | 26.13 | 34.21 |
| 7 d | 32.94 | 45.67 | 43.17 | 42.48 | 50.51 |

TABLE 3 test results of compressive strengths of cement pastes

| Compressive strengths | Blank control group | Embodiment 1 | Embodiment 2 | Embodiment 3 | Embodiment 4 |
|---|---|---|---|---|---|
| 1 d | 12.37 | 21.37 | 19.14 | 20.87 | 24.95 |
| 3 d | 35.15 | 43.47 | 41.41 | 46.13 | 49.21 |
| 7 d | 55.94 | 68.67 | 63.17 | 63.48 | 73.51 |

What is claimed is:

1. A regulating cementitious material for promoting hydration of Portland cement, comprising ingredients in parts by weight as follows:
ye'elimite, 27~68 parts;
anhydrite, 29~68 parts;
lithium nitrite, 2~5 parts;
ethylene glycol monoisopropanolamine, 0.14~0.29 parts;
triethanolamine acetate, 0.04~0.09 parts; and
polyglycerol, 0.04~0.09 parts;
wherein the ingredients in total are 100 parts by weight.

2. The regulating cementitious material according to claim 1, wherein the ye'elimite is prepared by:
mixing powders of calcium carbonate ($CaCO_3$), aluminum trioxide ($Al2O3$) and calcium sulfate ($C\bar{S}H2$) according to a molar ratio of $CaCO3:Al2O3:C\bar{S}H2=3:3:1$ to obtain a powder mixture,
adding a powder of ye'elimite of 5% by weight of the powder mixture into the powder mixture as crystalline seeds,
then sequentially mixing evenly, compacting, and calcining by raising a temperature to 1350° C. in 2 hours (h) and then keeping the temperature for 2 h, afterwards, cooling to a room temperature in 1 minute (min), and grinding until all passing through 200 mesh sieve;
wherein a purity of the ye'elimite is greater than 97.5%.

3. The regulating cementitious material according to claim 1, wherein the anhydrite is prepared by keeping an anhydrite at 200° C. for 2 h in a high-temperature furnace.

4. The regulating cementitious material according to claim 1, wherein a molar ratio of the anhydrite to the ye'elimite is 11.

5. An application of the regulating cementitious material according to claim 1 in promoting hydration of Portland cement, wherein an addition amount of the regulating cementitious material is 10% by weight of the Portland cement.

6. A cement comprising: Portland cement and the regulating cementitious material according to claim 1; wherein an amount of the regulating cementitious material is 10% by weight of the Portland cement.

* * * * *